United States Patent

[11] 3,599,908

[72] Inventor James Martin
Southlands Manor, Southlands Road,
Denham, near Uxbridge, Middlesex,
England
[21] Appl. No. 885,712
[22] Filed Dec. 17, 1969
[45] Patented Aug. 17, 1971
[32] Priority Jan. 2, 1969
[33] Great Britain
[31] 281/69

[54] PARACHUTE APPARATUS
5 Claims, 3 Drawing Figs.

[52] U.S. Cl. .................................................. 244/152
[51] Int. Cl. .................................................. B64d 17/36
[50] Field of Search .......................................... 244/152, 149, 142

[56] References Cited
UNITED STATES PATENTS
3,055,621 9/1962 Martin ........................... 244/142
3,222,014 12/1965 Bowden et al. ............... 244/152 X
FOREIGN PATENTS
1,385,637 12/1964 France ......................... 244/152

Primary Examiner—Milton Buchler
Assistant Examiner—Carl A. Rutledge
Attorney—Kurt Kelman ABSTRACT: Parachute apparatus comprising a main parachute and a drogue parachute connected to the crown of the main parachute, the main parachute having at least one antisquid line connected between the crown thereof and the shrouds or parts connected thereto, such line having a length sufficient to enable the parachute to squid under a drogue drag load, two spaced-apart portions of the line being interconnected by disconnectable means forming a loop in the line, the overall length of the antisquid line being insufficient to permit the parachute to squid, when the loop is present, the arrangement being such that the parachute may be deployed without squidding when the drogue drag load on the crown thereof is below a predetermined value whereas, when said drogue drag load exceeds said predetermined value, the means interconnecting the spaced-apart line portions is disconnected by said drag load to separate the portions and to increase the overall length of the antisquid line by the length of the loop so as to permit squidding of the parachute.

PATENTED AUG 17 1971 3,599,908

Inventor
JAMES MARTIN
By [signature]
AGENT

Inventor
JAMES MARTIN
By [signature]
AGENT

3,599,908

PARACHUTE APPARATUS

This invention concerns improvements in parachute apparatus of the kind in which two or more parachutes are connected to one another and are adapted to be deployed in succession. The invention has particular application in parachute apparatus of the kind used in aircraft ejection seats.

In my U.S. Pat. No. 3,055,621, I have described and claimed parachute apparatus comprising a main parachute and a drogue parachute connected to the crown of the main parachute, the main parachute having at least one antisquid line connected between the crown thereof and the shrouds or parts connected thereto so as to prevent squidding of the main parachute under drogue drag loads applied to its crown during deployment. The antisquid line was adapted to be disabled, thereby to permit squidding of the main parachute by the drag load applied by the drogue upon deployment of the latter at air speeds in excess of that at which full deployment of the main parachute is permissible. The antisquid line was, in certain embodiments, arranged to fracture between its ends and, in other embodiments, was arranged to become disconnected from either its connection to the crown of the parachute or its connection to the shrouds or parts connected to such shrouds.

It has been found that, in certain embodiments, it may not be desirable to have the disconnected or broken antisquid line floating loose within the parachute, and one object of this invention is to provide an improved apparatus which obviates this specific disadvantage.

According to this invention, there is provided parachute apparatus of this type, comprising a main parachute and a drogue parachute connected to the crown of the main parachute, the main parachute having at least one antisquid line connected between the crown thereof and the shrouds or parts connected thereto, such line having a length sufficient to enable the parachute to squid under certain drogue drag loads, at least two spaced-apart portions of the line being interconnected by disconnectable loop-forming means so that when the loop is present, the overall length of the antisquid line is not sufficient to permit the parachute to squid, the arrangement being such that the parachute may be deployed without squidding when drogue drag loads on the crown thereof are below a predetermined value whereas, when such drogue drag loads exceed said predetermined value, the means interconnecting the spaced-apart portions permits such portions to separate so that the overall length of the antisquid line increases and permits appropriate squidding of the parachute.

Conveniently, said means merely comprises a rupturable element extending between said spaced-apart portions of the antisquid line, such element fracturing when the loads exceed said predetermined value.

Such element may comprise a cord or the like or may merely be formed by a length of stitching. Alternatively, however, a releasable two-part coupling may be provided.

In order that the invention may be more readily understood, embodiments of a parachute with antisquid line will now be described by way of example and with reference to the accompanying drawing in which.

Figure 1:
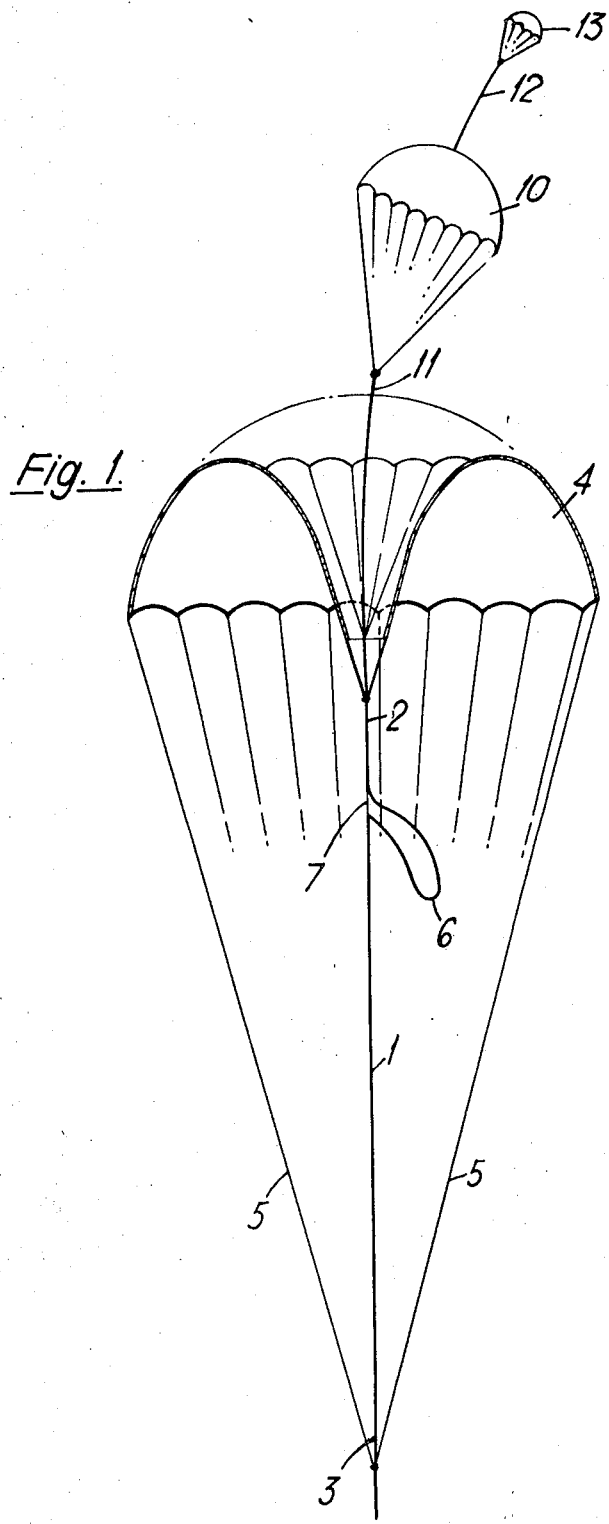
FIG. 1 is a diagrammatic side view of a parachute and antisquid line in an effective condition.
Figure 2:
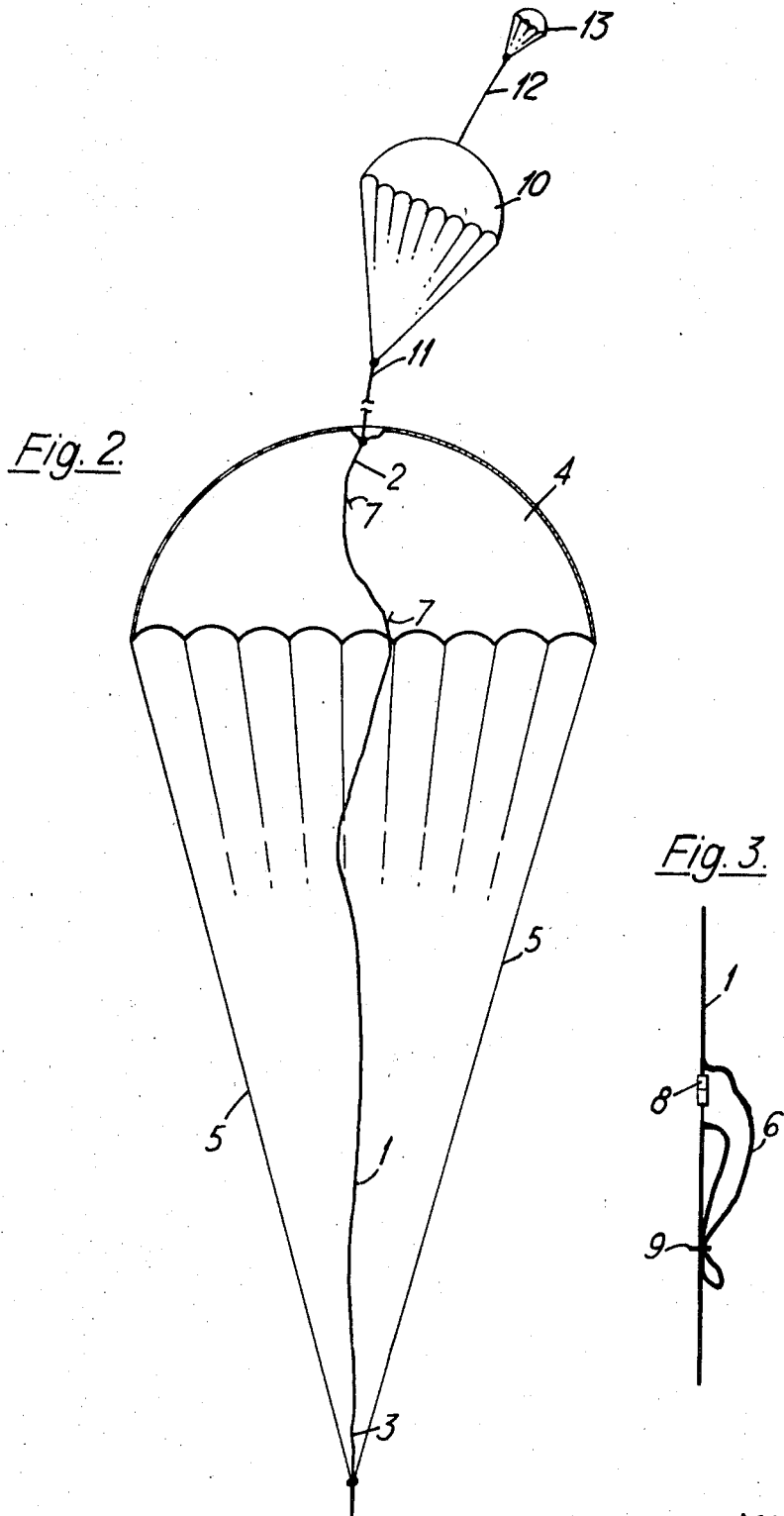
FIG. 2 is a similar view to FIG. 1 but showing the line in an ineffective condition in which the parachute could, if necessary, squid.

In the embodiments of FIGS. 1 and 2, the antisquid line 1 merely comprises a length of cord having opposite end portions 2,3 thereof respectively connected to the crown 4 and to the shroud lines 5 of the parachute. The antisquid line is formed with a loop 6 as a result of spaced-apart parts of the line being connected to one another by means of a weak and rupturable link 7, such as a cord. Alternatively, a releasable two-part connector 8 may be provided, as shown in FIG. 3.

Such weak link 7 may also be formed simply by stitching provided to secure together the two spaced-apart parts of the antisquid line.

Figure 3:
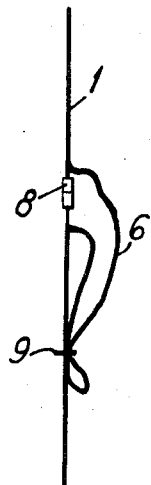
FIG. 3 is a fragmentary view of a portion of a second embodiment of an antisquid line.

If desired, the loop 7 may be connected to another portion of the antisquid line in an easily releasable manner, as shown at 9 in FIG. 3, to aid stowage and packing of the parachute.

If desired, more than one antisquid line 1 may be provided in a single parachute.

For the sake of completeness a drogue parachute 10 is shown in such drawing connected by line 11 to the parachute 4, such drogue parachute 10 in turn being connected to a controller parachute 12 by line 13.

I claim:

1. Parachute apparatus comprising a main parachute and a drogue parachute connected to the crown of the main parachute, the main parachute having at least one antisquid line connected between the crown thereof and the shrouds or parts connected thereto, such line having a length sufficient to enable the parachute to squid under a drogue drag load, two spaced-apart portions of the line being interconnected by disconnectable means forming a loop in the line, the overall length of the antisquid line being insufficient to permit the parachute to squid, when the loop is present, the arrangement being such that the parachute may be deployed without squidding when the drogue drag load on the crown thereof is below a predetermined value whereas, when said drogue drag load exceeds said predetermined value, the means interconnecting the spaced-apart line portions is disconnected by said drag load to separate the portions and to increase the overall length of the antisquid line by the length of the loop so as to permit squidding of the parachute.

2. Parachute apparatus according to claim 1, wherein said means comprises a rupturable element extending between said spaced-apart portions of the antisquid line, said element fracturing when the load exceeds said predetermined value.

3. Parachute apparatus according to claim 2, wherein said element is a length of stitching extending between said spaced-apart portions of the antisquid line.

4. Parachute apparatus according to claim 1, wherein said means comprises a two-part coupling, the parts being arranged automatically to separate when said load exceeds said predetermined value.

5. Parachute apparatus according to claim 1, wherein frangible means retains said loop adjacent said antisquid line.